(12) United States Patent
Wang et al.

(10) Patent No.: US 11,409,506 B2
(45) Date of Patent: Aug. 9, 2022

(54) DATA PLANE SEMANTICS FOR SOFTWARE VIRTUAL SWITCHES

(71) Applicant: Intel Corporation, Santa Clara, CA (US)

(72) Inventors: Yipeng Wang, Portland, OR (US); Ren Wang, Portland, OR (US); Tsung-Yuan C. Tai, Portland, OR (US); Jr-Shian Tsai, Portland, OR (US); Xiangyang Guo, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 16/142,401

(22) Filed: Sep. 26, 2018

(65) Prior Publication Data

US 2020/0097269 A1 Mar. 26, 2020

(51) Int. Cl.
| | | |
|---|---|---|
| *G06F 9/44* | (2018.01) | |
| *G06F 9/445* | (2018.01) | |
| *G06F 11/36* | (2006.01) | |
| *G06F 8/41* | (2018.01) | |
| *G06F 9/455* | (2018.01) | |
| *G06F 8/30* | (2018.01) | |

(52) U.S. Cl.
CPC ............ *G06F 8/41* (2013.01); *G06F 9/45516* (2013.01); *G06F 8/311* (2013.01)

(58) Field of Classification Search
CPC .......... G06N 20/00; G06N 3/08; G06N 7/005; G06F 17/11; G06F 2209/484; G06F 9/5072; G06F 9/522; G06F 9/547; G06F 9/4494; G06F 9/45516; G06F 8/41; G06F 8/311; H04L 45/64; H04L 43/08; H04L 67/1002; H04L 47/781; H04L 41/0893
See application file for complete search history.

(56) References Cited

U.S. PATENT DOCUMENTS

| | | | | |
|---|---|---|---|---|
| 10,268,464 | B2 * | 4/2019 | Daly | ........................ G06F 8/447 |
| 10,516,626 | B1 * | 12/2019 | Kodeboyina | ........... H04L 45/74 |
| 10,845,995 | B2 | 11/2020 | Wang et al. | |
| 2019/0044869 | A1 | 2/2019 | Wang et al. | |

OTHER PUBLICATIONS

Kekely et al., Mapping of P4 Match Action Tables to FPGA, 2 pages (Year: 2017).*
Choi, et al, "PVPP: A Programmable Vector Packet Processor" SOSR '17, Apr. 3-4, 2017, Santa Clara, CA, 2 pages.
(Continued)

*Primary Examiner* — Thuy Dao
(74) *Attorney, Agent, or Firm* — Compass IP Law PC

(57) ABSTRACT

Examples may include a method of compiling a declarative language program for a virtual switch. The method includes parsing the declarative language program, the program defining a plurality of match-action tables (MATs), translating the plurality of MATs into intermediate code, and parsing a core identifier (ID) assigned to each one of the plurality of MATs. When the core IDs of the plurality of MATs are the same, the method includes connecting intermediate code of the plurality of MATs using function calls, and translating the intermediate code of the plurality of MATs into machine code to be executed by a core identified by the core IDs.

29 Claims, 9 Drawing Sheets

(56) References Cited

OTHER PUBLICATIONS

Kang, "Introduction to Cache Allocation Technology in the Intel Xeon Processor E5v4 Family", Feb. 11, 2016, 6 pages.
Mittal, "A Survey of Techniques for Cache Locking," ACM Transactions on Design Automation of Electronic Systems, vol. 21, No. 3, Article 49, May 2016, 24 pages.
P4 Language Specification, "The P4 Language Consortium," Mar. 22, 2017, 129 pages.
P4.org, "P4 Language Tutorial", Jun. 6, 2018, 120 pages, https://bit.ly/p4d2-2018-spring.
Shahbaz, et al, "PISCES: A Programmable, Protocol-Independent Software Switch", Apr. 22, 2016, 14 pages, https://www.cs.princeton.edu/~jrex/papers/pisces-draft.pdf.

\* cited by examiner

DATA PLANE SEMANTICS FOR SOFTWARE VIRTUAL SWITCHES

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2018, Intel Corporation, All Rights Reserved.

BACKGROUND

Software defined networking (SDN) and virtual network function (VNF) technologies enable communications service providers to create a pool of data center resources on general purpose computing platforms for computing, networking, and storage. These technologies make use of the programmability, flexibility, and low operational cost provided by software running on general purpose computing platforms, as compared to fixed purpose networking hardware (e.g., network processing devices).

A virtual router and/or virtual switch implemented in software (generally referred to as a software virtual switch) have recently been used in SDN and VNF environments for processing of network data packets. Software virtual switches face problems similar to hardware switches in that a fixed range of protocols are defined in the switch when shipped to a customer. Although a software virtual switch is more easily configured and can be updated more frequently than a hardware switch, the software virtual switch still requires a large amount of engineering effort to add new protocols.

To address the issue of configurability of hardware switches, a domain specific language (DSL) called P4 has been defined. P4 is a protocol independent language to describe the data plane of a switch. The P4 language allows a user to define protocols and/or processing stages for the switch. P4 can also be used for programming software virtual switches running on general purpose computing platforms. P4 is defined to be platform agnostic; however, P4 is currently not designed to take full advantage of some general-purpose computing architectures, which allow software virtual switches to have features different than hardware switches to gain optimal performance. In particular, P4 lacks the semantics to be used optimally for software virtual switches on general-purpose computing platforms supporting Intel® Architecture (IA) instruction sets. For example, P4 lacks the means for a programmer to define different candidate classification algorithms to use in the software virtual switch, or to define data structures that can improve processor performance, or be aware of processor and cache layout.

DETAILED DESCRIPTION

Networking declarative languages can reduce the complexity of programming a switch. For example, the language called P4, although originally designed for programming networking processors, can be used relatively seamlessly for defining functions in software virtual switches. However, due to the significant differences between hardware switches and general-purpose computing platforms, using P4 as a default declarative language without any extensions does not result in optimal performance of software virtual switches running on general purpose computing platforms. Embodiments of the present invention provide a set of declarative language semantics designed to allow a programmer to define data plane functionality in software virtual switches in order to optimize the performance of the software virtual switch on a general-purpose computing platform.

P4 is a domain-specific language that expresses how a pipeline of network forwarding elements should process packets using an abstract forwarding model. In this model, each packet first passes through a programmable parser, which extracts headers. A P4 program specifies the structure of each possible header as well as a parse graph that expresses ordering and dependencies. The packet then passes through a series (e.g., a pipeline) of match-action tables (MATs). A MAT specifies what data the packet is to be matched with, the list of possible actions, and optionally specifies a number of table properties such as size, default action, static entries, priority, etc. Each MAT contains one or more entries called rules or flows. An entry contains a specific key to match on, a single action that is executed when the packet matches the entry, and action data (which may be empty). The P4 program specifies the fields that each of the MATs may match and the control flow among them, as well as the spectrum of permissible actions for each table. At runtime, (i.e., while the switch is forwarding packets), controller software (in the control plane) may add, remove, and modify table entries with particular match-action rules that conform to the P4 program's specification. Finally, a deparser writes the header fields back onto the packet before sending the packet out an appropriate port.

Although the P4 language is referenced herein, embodiments of the present invention may be used with other declarative languages.

Figure 1:
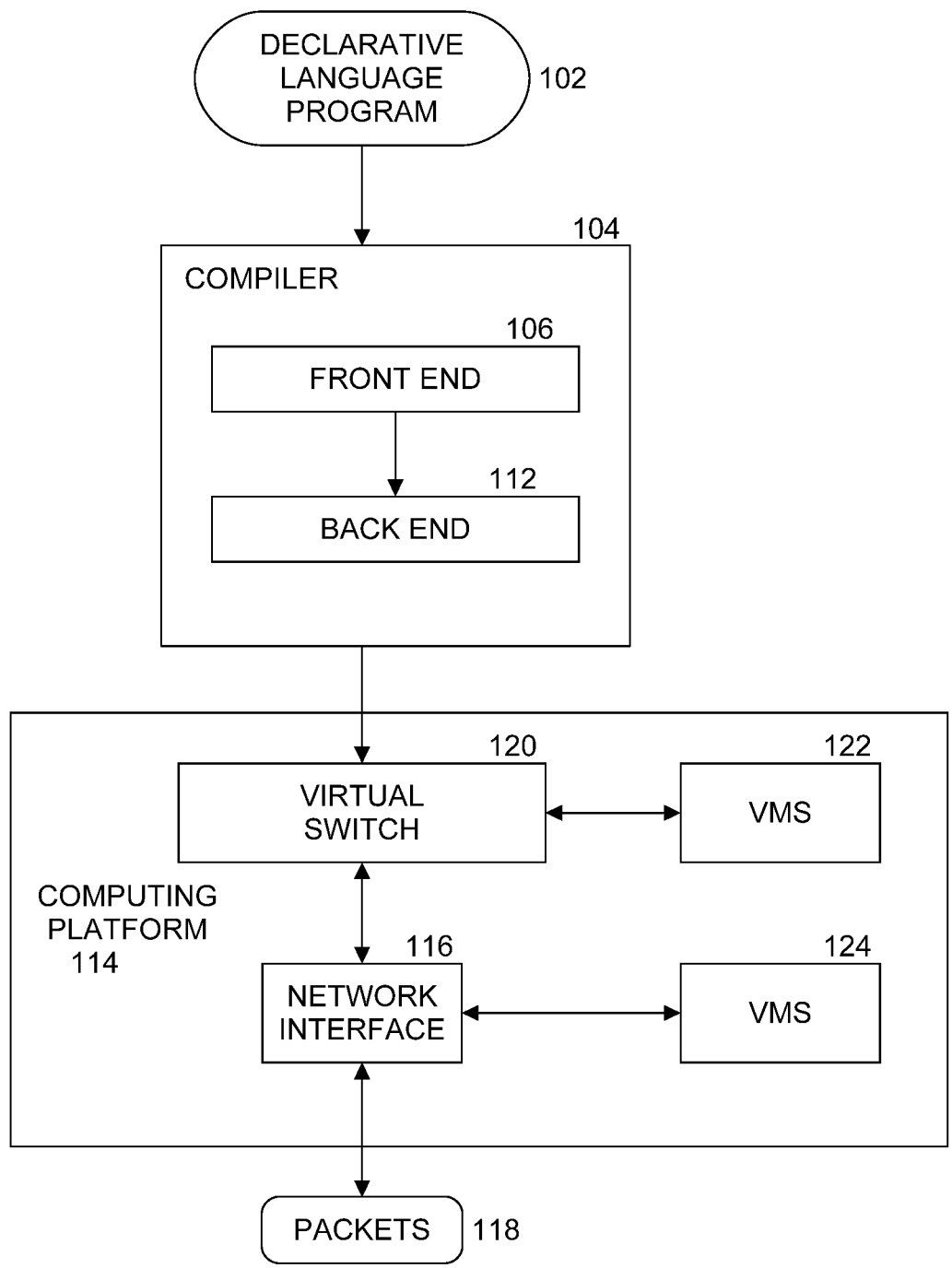
FIG. 1 illustrates an example computing platform including a virtual switch.

FIG. 1 illustrates an example 100 computing platform 114 including a virtual switch 120. Computing platform 114 includes at least one network interface 116 (such as a network interface controller (NIC)) to send and receive packets 118. At least one network interface 116 forwards received packets to virtual switch 120 for processing. In an embodiment, virtual switch 120 is implemented in software executing on one or more processing cores (not shown in FIG. 1) of computing platform 114. Virtual switch 120 relies on instructions from a controller such as an application program (not shown) to determine the virtual switch's behavior. The behavior of the virtual switch can be defined in terms of a collection of MATs. When one of the packets 118 arrives at a particular MAT within virtual switch 120, the virtual switch seeks to find a matching rule/flow and if so, executes a related action. If more than one flow matches the packet, then the flow with the highest priority takes precedence.

Computing platform 114 also includes a plurality of virtual machines (VMs), or containers in the case of cloud-native infrastructures wherein containers are mostly used instead of VMs. Zero or more VMs 122 may be used to process packets received from virtual switch 120. The same or different zero or more VMs 124 may be used to send and receive packets to and from at least one network interface 116.

A programmer writes a declarative language program 102 to implement desired packet processing functions of virtual switch 120. The declarative language program is input to compiler 104. Compiler 104 includes front end component 106 to parse the program and generate an intermediate code representation. Compiler 104 includes back end component 112 to generate machine code from the intermediate code. The machine code executing on one or more cores of computing platform 114 comprises an embodiment of virtual switch 120.

An embodiment of the present invention includes declarative language semantics to specify assignment of the match-action tables to cores on a multi-core general-purpose computing platform. Compiler backend 112 can automatically assign the MATs to cores, but a declarative language semantic for the virtual switch programmer to specify the mapping is useful. For example, there are two approaches to assigning packet processing stages to cores: 1) a run-to-completion model and 2) a pipelined model. In the run-to-completion model, each core performs the same complete packet processing functions, while in the pipelined model, each core performs one stage of the packet processing pipeline and passes the packet to the next stage of the pipeline, which could potentially be running on a different core than the previous stage. If the pipelined model is used, extra code is needed in the virtual switch (e.g., to handle the core-to-core communication rings).

Both models have advantages and disadvantages. The run-to-completion model avoids the core-to-core communication overhead, while the pipelined model could avoid a large code footprint on a single core and maintains better instruction and data cache locality in each core's private caches. Without run-time profile information, compiler backend 112 cannot know which model should be optimally selected for a given workload. However, the programmer could have a priori knowledge of the underlying computing platform and the current traffic pattern of data packets so that the programmer could choose an optimal model during the programming phase of the virtual switch using the semantics described herein. Further, in a general-purpose computing platform including a big-little core architecture (such as Intel® Architecture computing platforms), the programmer could assign more important or more frequently used pipelines and/or match-action tables to the big core while assigning rarely accessed MATs to the little core.

With this declarative language semantic, a programmer can describe MATs as shown in the example below. The non-uniform memory access (NUMA) ID and core ID are logical identifiers.

```
[AssignToNumaNode(1), AssignToCore(2)]
Table ip4_match {
}
[AssignToCore(0)]
Table ip6_match {
}
```

This extension could also be used to assign pipeline level core mapping:

```
[AssignToNumaNode(1), AssignToCore(2)]
control l2 pipeline {
    table 1:
    table 2:
    ...
}
```

Table level core mapping assigns tables to a plurality of cores. In contrast, pipeline level core mapping is more coarse-grained, which means a set of MATs defined in a packet processing pipeline will be run on a single designated core. Different pipelines will use different cores. This declarative language semantic enables the programmer to control the allocation of core resources in general purpose computing platform 114.

In one embodiment, compiler 104 compiles high-level declarative language program 102 (i.e., source code) into multi-threading C/C++ code. Compiler 104 checks general purpose computing platform 114 information and attributes within the source code. Compiler 104 inserts necessary threading affinity application program interfaces (APIs) (e.g., SetThreadAffinityMask( ) on Windows® based computing platforms, and sched_setaffinity( ) on Linux® based computing platforms) to each thread, which corresponds to the MAT or pipeline defined by the programmer.

Figure 2:
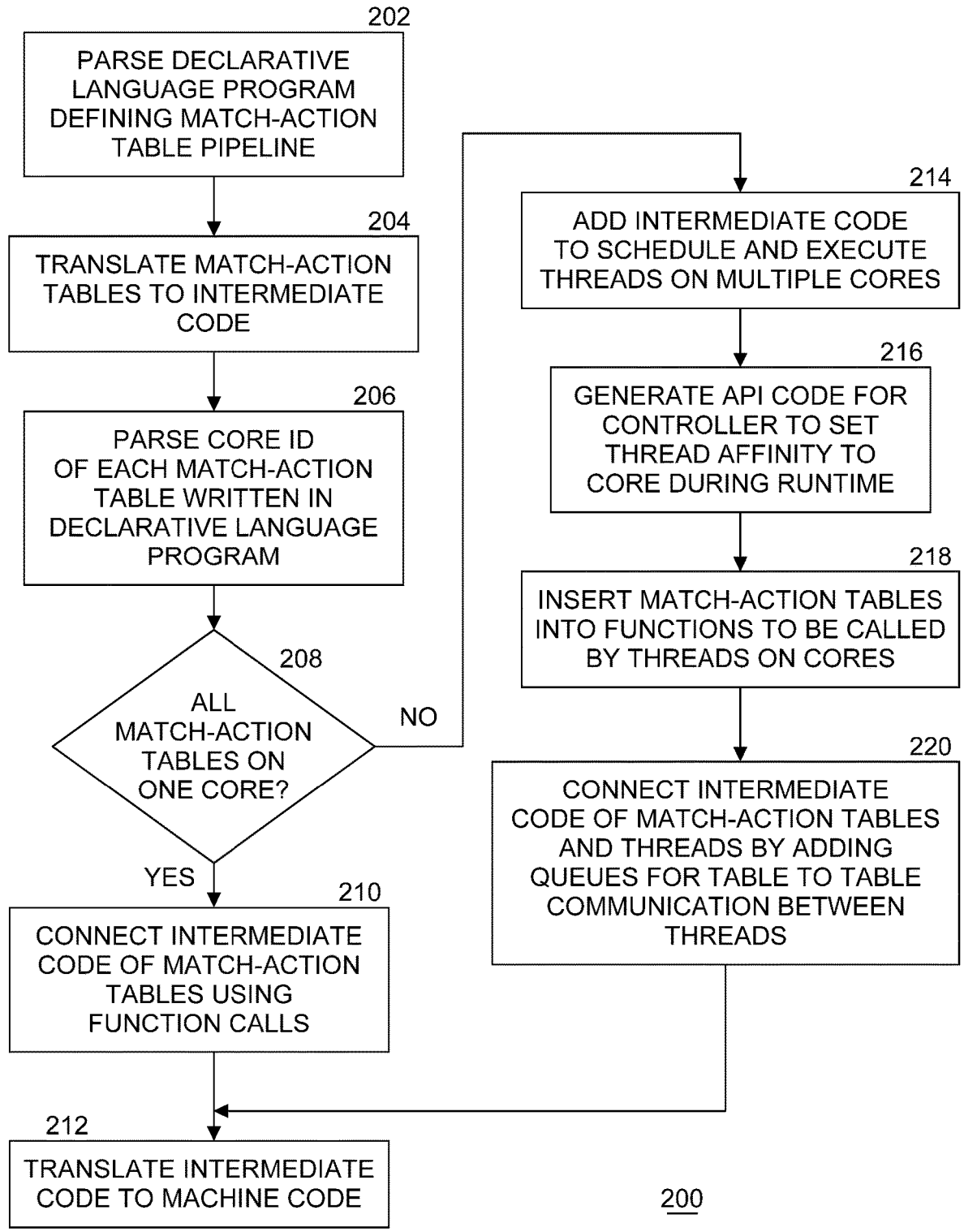
FIG. 2 illustrates an example flow diagram of processing by a compiler to assign match-action tables to cores.

FIG. 2 illustrates an example flow diagram of processing by a compiler to assign match-action tables (MATs) to cores. At block 202, front end 106 of compiler 104 parses declarative language program 102 that defines a MAT pipeline. At block 204, front end 106 translates the one or more MATs of the match-action pipeline into intermediate code. In an embodiment, the intermediate code is in the C or C++ languages. At block 206, front end 106 parses a core ID of each MAT in the pipeline as written in declarative language program 102. In the example above, this is shown as AssignToCore(Core_ID). In an embodiment, front end 106 builds a list of MAT and specified core ID pairs. At block 208, if all MATs are specified to be processed by one core (e.g., all of the MATs in the list have the same specified core ID), then processing continues with block 210. At block 210, front end 106 connects the intermediate code of the MATs using function calls. A pseudo code of the generated intermediate language is shown below. A "for: loop is used to iterate all match action tables and call each table's process function.

Pipeline_process( )

```
For each table in table list of the pipeline:
    missed_packets = Process_table(all_packets)
    all_packets = missed packets
```

At block 212, back end 112 translates the intermediate code into machine code for later execution by one core of general-purpose computing platform 114.

At block 208, if all MATs are not specified to be on the same core (e.g., at least two of the MATs in the list have different specified core IDs), then processing continues with block 214. At block 214, front end 106 adds intermediate code to schedule and execute a plurality of threads on multiple cores. In an embodiment, one thread is to be scheduled on each core specified. In another embodiment, a thread is to be scheduled for each MAT on a specified core. In an embodiment, block 214 is implemented using "pthread" library functions called "pthread_create" and "pthread_setaffinity_np". Optionally, in one embodiment, at block 216 front end 106 generates API code for a control plane application running on the general-purpose computing platform that controls virtual switch 120 to be able to set a thread affinity for each core during runtime. At block 218, front end 106 inserts MATs into functions to be called by threads on the cores. At block 220, front end 106 connects the intermediate code of the MATs and the threads by adding queues for table to table communication between the threads. In an embodiment, the queues are stored in a first-in-first-out (FIFO) queue in a shared memory location accessible by the cores. Software FIFO queue data structures are commonly used in networking for inter-stage communication because the ordering of packets needs to be maintained while passing between processing stages. Queues can be implemented as lockless data structures to avoid the extra overhead caused by software locking mechanisms. In another embodiment, hardware queues can be used. Hardware queues can be hardware logic that assists with the data transferring between two software threads.

Multi-thread, multi-core processing completes at block 212 where back end 112 translates the intermediate code into machine code for later execution by a plurality of cores of general-purpose computing platform 114. In embodiments of the present invention a new software cache data structure, called a flow cache, can be defined using the declarative language. A flow cache is also a match-action table but one difference is that the flow cache tries to cache match-actions combining multiple match-action tables and store the flow keys inside the flow cache. Different from rules in match action table, flow keys are the header fields interest of packets. Different packets may match the same rule in a rule table but contain very different header fields (i.e., flow keys). For example, two packets containing IP header fields of 1.1.1.1 and 1.1.1.2 match the same rule of 1.1.1.0/24. However, they have different header fields which makes them different regarding their flow keys. The two packets will end up as two entries in the flow cache.

In an embodiment, a flow cache is a data structure to store relevant packet header fields. A flow cache may be accessed by simple matching (no wild-carding) in constant time (as opposed to checking MATs in O(n) time where n is the number of tables. The entries in the flow cache may be evicted by newly inserted entries. On general-purpose computing platform 114, software caching mechanisms are useful, because unlike in a networking processor, a general-purpose computing platform such as an Intel Architecture system does not have ternary content addressable memory (TCAM) or special application specific integrated circuit (ASIC) logic to specifically accelerate wild-card matching. Trading cache memory for calculation time is an optimization for processing cores.

A flow cache may be inserted into any location within a packet processing pipeline to improve performance. The code below shows an example of the flow cache semantic:

```
©2018, Intel Corporation, All Rights Reserved.
Cache L4_match_cache {
    Tables =[ip_match_table, udp_match_table]
}
Table ip_match_table{
    Key = {headers.ip: lpm; }
}
Table udp_match_table{
    Key = {headers. src_portL: exactmatch; }
    Key = {headers.dst_port: exactmatch; }
}
```

Figure 3:
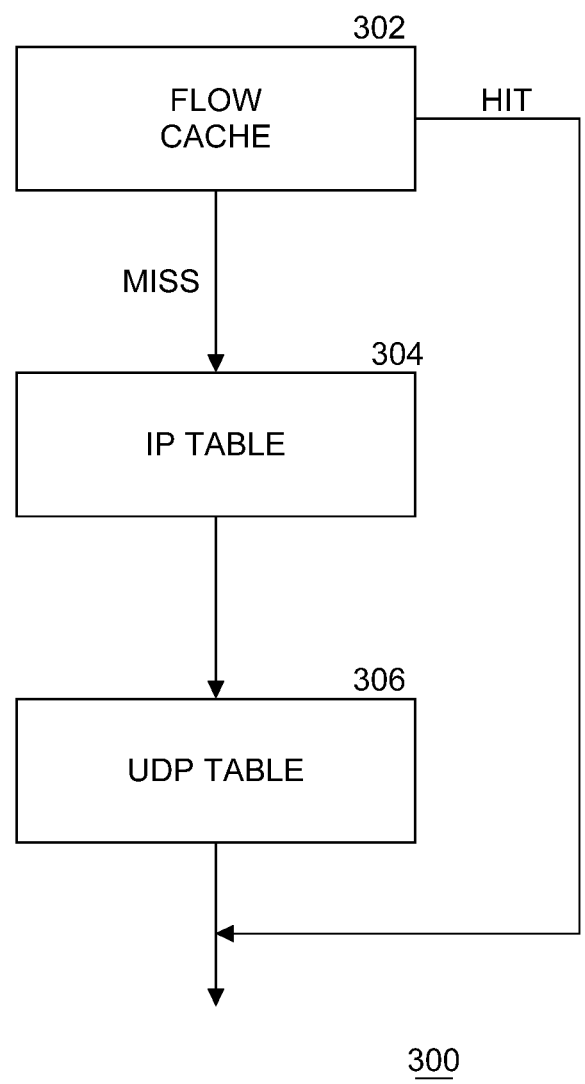
FIG. 3 illustrates an example flow cache in a packet processing pipeline.

FIG. 3 illustrates an example flow cache in a packet processing pipeline. In this example, a software flow cache 302 is defined in front of two match-action tables 304, 306 for Internet Protocol (IP) and User Datagram Protocol (UDP) fields, respectively. The key of this cache is the IP fields plus the UDP fields of packet headers and the action is derived from the two tables and also stored in the flow cache. If a packet hits in the flow cache, the action combined from the following IP and UDP match action tables will immediately applied to the packet and the packet can bypass both match action tables and go to the next processing stage. If a packet misses in the flow cache, the regular processing pipeline will be used. The packet needs to go through both match action tables without a cache. When a miss happens, the flow key together with the actions from the two tables will be inserted into the flow cache. If the cache is full, an old entry in the cache will be evicted and the new entry will be inserted.

Frequently matched flows are cached in flow cache 302. Less recently used entries in flow cache 302 are automatically evicted out of the flow cache. In an embodiment, a least recently used (LRU) policy is implemented by compiler backend 112 to replace stale entries.

Since flow cache 302 is not required to store every flow but only hot flows, the flow cache can be lightweight in the sense of cache/memory requirements and fast on processing speed on a core. The flow cache is fast because the flow cache is an exact match cache, without wild-carding capability. The flow cache does not need to be complex and does not use slow data structures for processes such as tuple-space-search and trie-based search. When the programmer knows that there are skewed traffic patterns or complex data structures, the programmer can use the flow cache language semantics of embodiments of the present invention to define flow caches in front of match-action tables to speed up the processing on a general-purpose computing platform.

Figure 4:
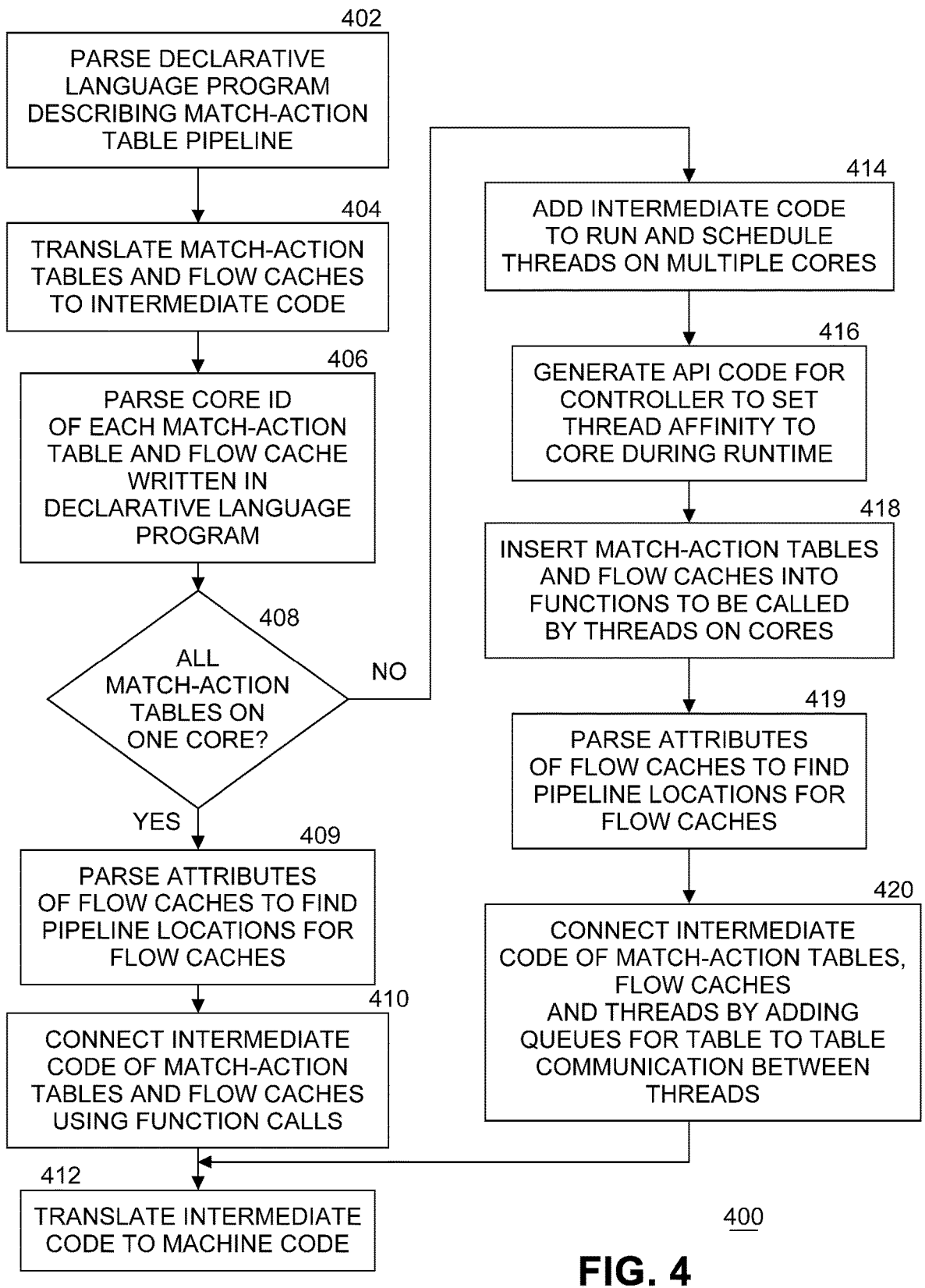
FIG. 4 illustrates an example flow diagram of processing by a compiler to assign match-action tables and flow caches to cores.

FIG. 4 illustrates an example flow diagram of processing by a compiler to assign match-action tables and flow caches to cores. FIG. 4 is similar to FIG. 2, but includes processing specific to flow caches. At block 402, front end 106 of compiler 104 parses declarative language program 102 that defines a match-action table pipeline, which in this scenario may also include one or more flow caches. At block 404, front end 106 translates the one or more MATs and one or more flow caches of the match-action pipeline into intermediate code. In an embodiment, the intermediate code is in the C or C++ languages. At block 406, front end 106 parses a core ID of each MAT and flow cache in the pipeline as written in declarative language program 102. In an embodiment, front end 106 builds a list of match-action tables/flow caches and specified core ID pairs. At block 408, if all MATs are specified to be processed by one core (e.g., all of the MATs in the list have the same specified core ID), then processing continues with block 409. At block 409, front end 106 parses attributes of flow caches to find pipeline locations for the flow caches. For example, a flow cache can be specified by the programmer at any stage of the packet processing pipeline to cache actions of MATs. At block 410, front end 106 connects the intermediate code of the MATs and one or more flow caches using function calls. At block 412, back end 112 translates the intermediate code into machine code for later execution by one core of general-purpose computing platform 114.

At block 408, if all MATs are not specified to be on the same core (e.g., at least two of the MATs in the list have different specified core IDs), then processing continues with block 414. At block 414, front end 106 adds intermediate code to schedule and execute a plurality of threads on multiple cores. In an embodiment, one thread is to be scheduled on each core specified. In another embodiment, a thread is to be scheduled for each MAT on a specified core. In an embodiment, block 414 is implemented using "pthread" library functions called "pthread_create" and "pthread_setaffinity_np". Optionally, in one embodiment, at block 416 front end 106 generates API code for a control plane application running on the general-purpose computing platform that controls virtual switch 120 to be able to set a thread affinity for each core during runtime. At block 418, front end 106 inserts MATs and the one or more flow caches into functions to be called by threads on the cores. At block 419, front end 106 parses attributes of flow caches to find pipeline locations for the flow caches. At block 420, front end 106 connects the intermediate code of the match-action tables/flow caches and the threads by adding queues for table to table communication between the threads. In an embodiment, the queues are stored in a first-in-first-out (FIFO) queue in a shared memory location accessible by the cores. Multi-thread, multi-core processing completes at block 412 where back end 112 translates the intermediate code into machine code for later execution by a plurality of cores of general-purpose computing platform 114.

One example of a declarative language extension to define this preference is:

```
control l2_pipeline {
    preference = LATENCY
}
```

In the example, the packet processing pipeline is latency-centric, meaning software virtual switch 120 should use smaller batches of packets to improve the latency. In embodiments of the present invention, the compiler backend interprets this preference selection. Besides batching size, latency sensitive pipelines may obtain more hardware/software resources during runtime. For example, the threads running the latency-sensitive pipeline may get higher priority from the OS's process scheduler point of view. The intermediate code may use certain APIs (e.g., sched_priority for Linux) to adjust the priority of the thread for scheduling. Micro-architecture level support is also possible. For example, a processor or memory may prioritize certain instructions over others from a different thread or memory address. This requires the capability from both the system and hardware. The language extension provides a way for the programmer to adjust this from high level and the compiler takes advantage of whatever is available in the computing system.

Using different software algorithms in software virtual switches affects packet processing performance. In embodiments of the present invention, a declarative language semantic is provided to enable the programmer to choose a specific algorithm for each match-action table. Each supported algorithm is described by a stored code fragment that can be modified by the compiler for selected MATs and/or flow caches.

An example of this semantic with two different algorithms used for different table types and pipeline stages are shown below. In embodiments, many different algorithms can be specified.

```
Table ip4_match {
    key = { headers.ip.dstAddr: lpm; 8-bit-trie} // longest prefix match
}
Table l3_match {
    key = { headers.ip.dstAddr: ternary; tuple-space-search } // full wild card match
}
```

In a hardware switch, the packet processing stages are usually fixed due to the hardware capabilities (such as bus width, number of ports, pipeline width, TCAM/CAM resources, etc.). However, in software virtual switch 120 running on one or more cores, implementation of a packet processing pipeline is flexible. For example, different packet batching sizes imply various performance-latency trade-offs. Using a large batch size could improve the packet processing throughput while also increase the latency. Specification of how to handle different packet traffic characteristics could be based on different aspects (i.e., latency vs. throughput). For example, to handle voice over IP (VoIP)/gaming traffic a shorter latency may be preferred so that a large batching size may not be optimal. It is beneficial for the programmer to be able to define a preference for higher throughput or shorter latency at the programming language level rather than by relying on compiler backend 112.

In the example, the programmer specifies the software algorithms for a key-matching action. For example, for a longest prefix matching (LPM) action, a multi-bit-trie algorithm with a variable length of bits can be specified. The implication of using a variable length of bits is the resulting variable memory consumption and trie depth trade-offs on a general-purpose processing core. The programmer has the knowledge of which algorithm may work better for the certain rule sets and can trade off memory usage for lookup speed.

Another example is the ternary matching key (wild card matching). The programmer could choose to use either a tree-based algorithm or a tuple space search algorithm (using a series of hash tables, for example). The tree-based algorithm usually has a faster look up speed but has a slower rule update speed. The tuple space search algorithm usually has a slower look up speed but a faster rule update speed. Depending on the requirements of virtual switch 120, the programmer could use the selecting software algorithm semantic to choose different algorithms to be used in the virtual switch for match-action tables.

Figure 5:
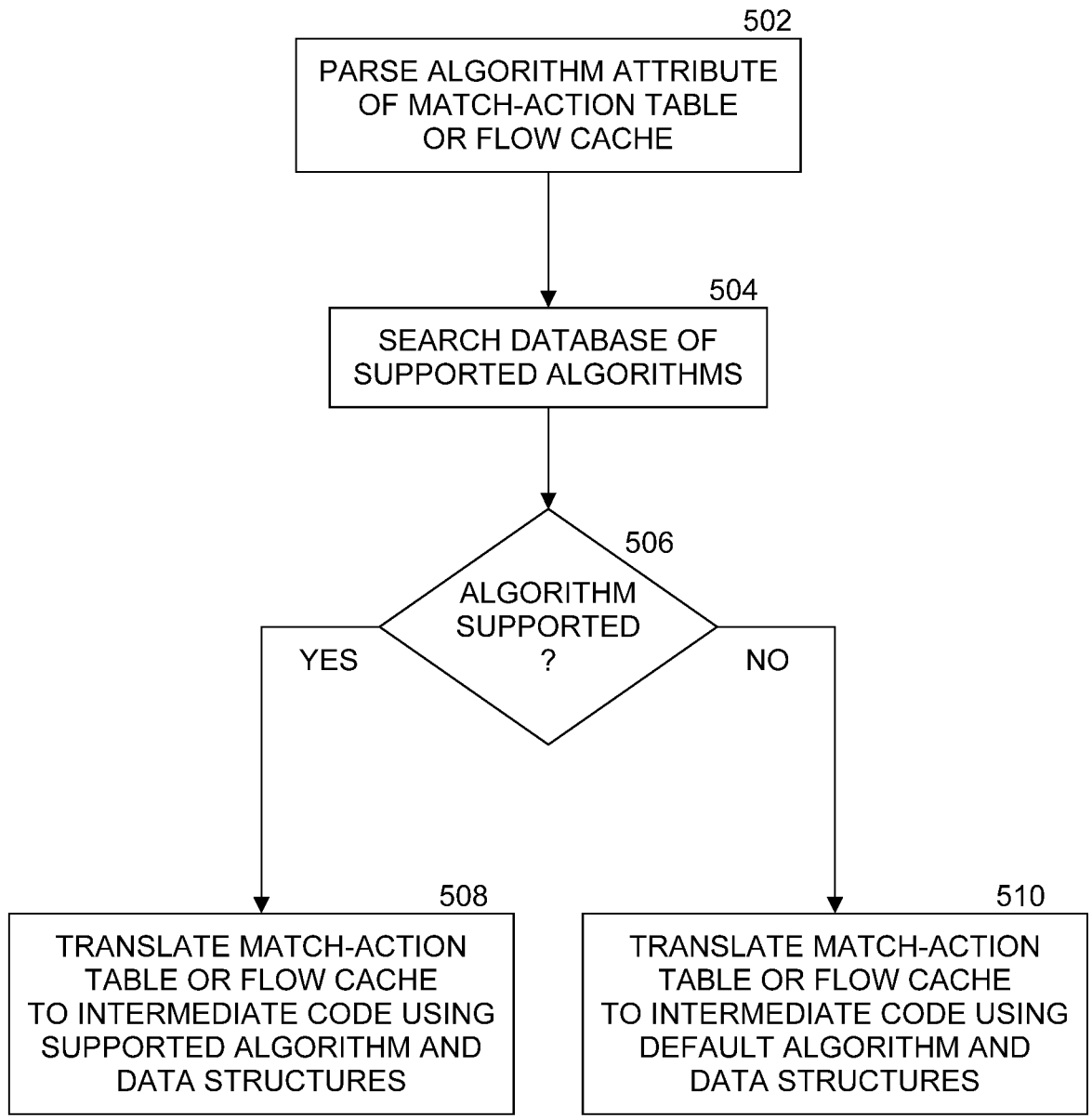
FIG. 5 illustrates an example flow diagram of processing by a compiler to select a packet processing algorithm.

FIG. 5 illustrates an example flow diagram of processing by a compiler to select a packet processing algorithm. In an embodiment, the processing of FIG. 5 is implemented in place of block 204 of FIG. 2, or in place of block 404 of FIG. 4. The processing of FIG. 5 is repeated for each match-action table and flow cache defined in declarative language program 102 that specifies a non-null algorithm attribute. At block 502, front end 106 parses an algorithm attribute of a MAT or flow cache. At block 504, front end 106 searches a database of supported algorithms and associated code fragments. In an embodiment, each algorithm is represented by a reusable fragment of code that implements the algorithm. If at block 506 the specified algorithm is supported by compiler 104, processing continues with block 508. If the specified algorithm is not supported by compiler 104, then processing continues with block 510. At block 508, front end 106 translates a MAT or flow cache into intermediate code using the specified and supported algorithm's code fragment and associated data structures. In an embodiment, the associated data structures are tree-based or hash-table based data structures, depending on which algorithm is specified. At block 510, front end 106 translates a MAT or flow cache into intermediate code using a default algorithm's code fragment and associated data structures.

In hardware switches, MATs are typically flashed onto a field programmable gate array (FPGA) or programmable logic. The MATs usually do not compete with the other hardware resources. However, for virtual switch 120 running on a general-purpose computing platform, if multiple MATs are being executed on one core, some hardware resources, including cache memory, may be impacted. In embodiments of the present invention, a declarative language semantic is provided to define the priority of the MATs when they are allocated to the same core. High priority MATs will be placed closer to the core or have exclusive cache memory to use, so that the processing time of these MATs will potentially be faster, or the worst execution time could be guaranteed. If the low-level hardware has the capability to prioritize one match action table over another, compiler backend 112 will prioritize selected MATs according to their cache memory usages as seen in the below example.

```
[priority_enabled]
Table ip4_match {
    Key = { headers.ip.dstAddr: lpm; }
    Priority = 0xff
}
```

When defining a MAT, the programmer can choose to enable priority. If so, each MAT requires an extra field to specify the priority of the table. The general-purpose computing platform will configure the core to use whatever technology is available on the general-purpose computing platform to give priority to selected MATs. For example, a high priority table can be pinned to a private processor cache (e.g., in an x86 64-bit platform ("Intel® Architecture"), one core may have two level of private processor caches including level one (L1) and level two (L2) cache. MATs in the private processor cache will have much faster access time.) so that other MATs cannot evict the cache lines out of the local cache. In an embodiment using cache allocation technology (CAT) commercially available from Intel® Corporation, one thread that processes the higher priority MATs can have dedicated level three (L3) cache capacity allocated. This data of the MAT is pinned in a level three (L3) cache. In other embodiments, other computing platform features may enable more flexible priority settings.

Figure 6:
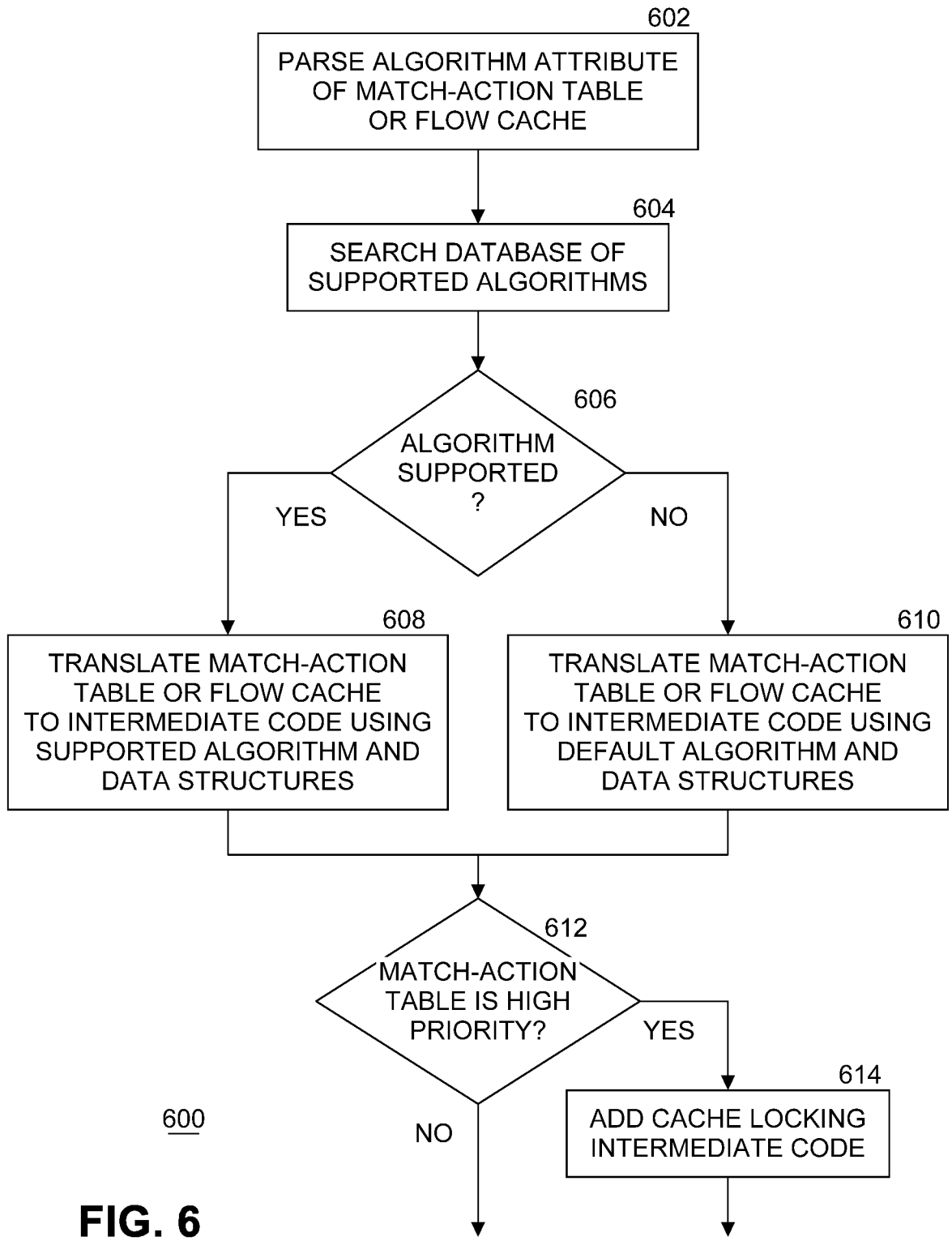
FIG. 6 illustrates an example flow diagram of processing by a compiler to set a match-action table priority.

FIG. 6 illustrates an example flow diagram of processing by a compiler to set a match-action table priority. FIG. 6 is similar to FIG. 5, but with the addition of the priority checking feature. The processing of FIG. 6 is repeated for each MAT and flow cache defined in declarative language program 102 that specifies a non-null algorithm attribute. At block 602, front end 106 parses an algorithm attribute of a MAT or flow cache. At block 604, front end 106 searches a database of supported algorithms. In an embodiment, each algorithm is represented by a reusable block of code that implements the algorithm. If at block 606 the specified algorithm is supported by compiler 104, processing continues with block 608. If the specified algorithm is not supported by compiler 104, then processing continues with block 610. At block 608, front end 106 translates a MAT or flow cache into intermediate code using the specified and supported algorithm and associated data structures. In an embodiment, the associated data structures are tree-based or hash-table based data structures, depending on which algorithm is specified. At block 610, front end 106 translates a MAT or flow cache into intermediate code using a default algorithm and associated data structures. At block 612, a priority of the MAT is checked. If the match-action table is set to a high priority by the programmer in declarative language program 102, then at block 614 front end 106 adds cache locking intermediate code to the intermediate code for the MAT to cause the L3 cache to be locked when processing the MAT on a core. In an embodiment, only two priority settings are available—a high priority and a normal priority. In other embodiments, more priority settings may be used.

Unlike hardware switches, software virtual switches usually need to support various I/O interfaces. For example, a Linux® kernel stack or data plane development kit (DPDK) could be chosen to interface between NIC and software. For VMs or containers, the virtual switch has to support other types of interfaces, for example "veth" or "vhost".

In an embodiment, compiler backend 112 compiles declarative language program 102 for virtual switch 120 that supports all supported interfaces and then the interfaces could be chosen during runtime. In another embodiment, if the programmer specifies which interface is needed, the code base and runtime logic is simplified.

For example:
control MatchActionPipe (in bit inputPort[DPDK], inout H parsedHeaders, out bit outputPort[virtio]);

In the above example, a pipeline is defined with certain ports. The input port will be a DPDK port and the output port will be "virtio". Compiler backend 112 could use this information to further simplify/optimize the I/O code to improve the performance of the virtual switch.

In embodiments of the present invention, a set of declarative language semantics is disclosed that can be applied to optimize the software virtual switch code on a general-purpose computing platform. In an embodiment, these features could be included in a completely new declarative language or added as extensions to an existing language such as P4. Other types of general-purpose computing hardware including graphics processing units (GPUs) or accelerators may also benefit from the disclosed semantics for packet processing.

Figure 7:
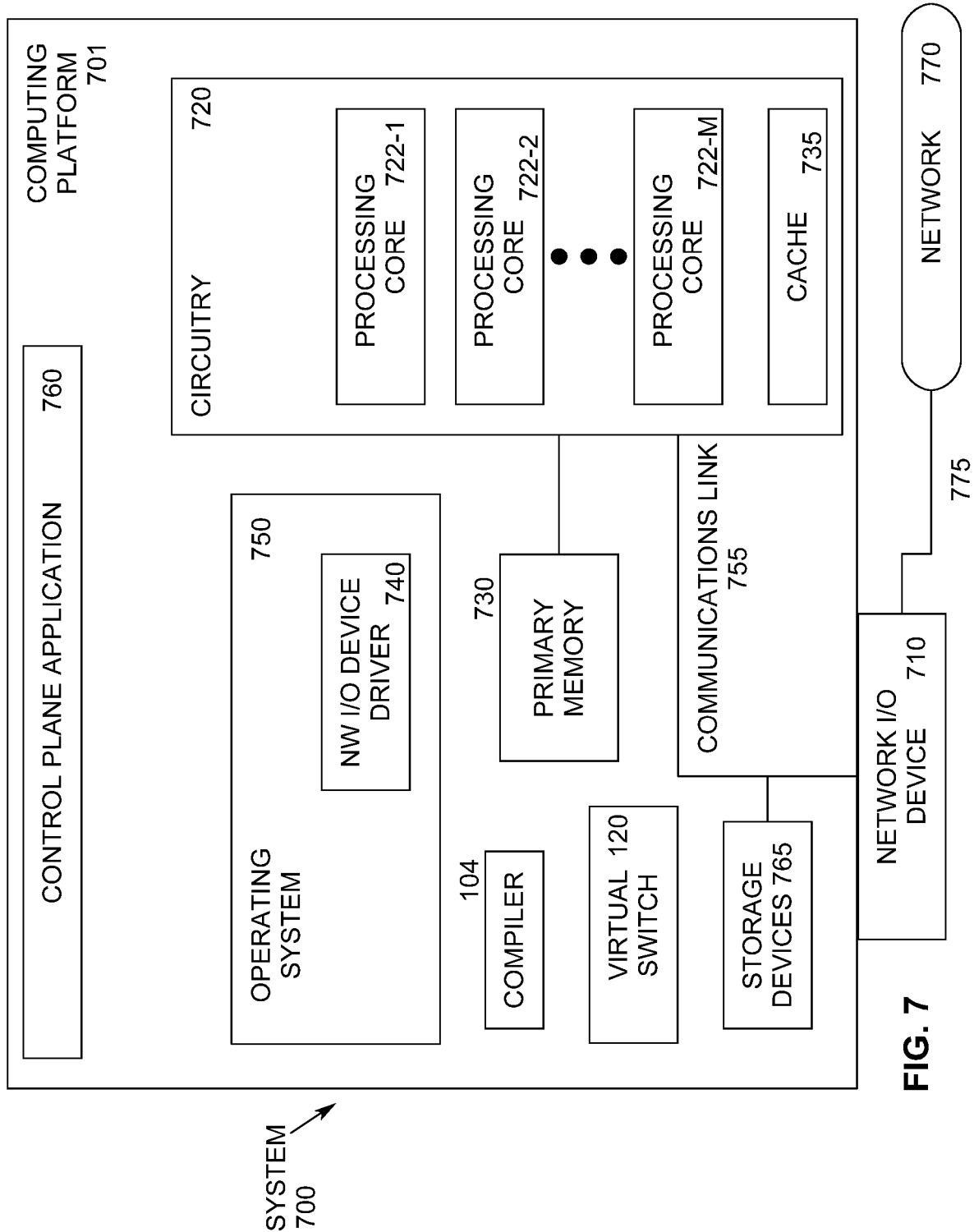
FIG. 7 illustrates an example computing system.

FIG. 7 illustrates an example computing system 700. As shown in FIG. 7, computing system 700 includes a computing platform 701 coupled to a network 770 (which may be the Internet, for example). In some examples, as shown in FIG. 7, computing platform 701 is coupled to network 770 via network communication channel 775 and through at least one network I/O device 710 (e.g., a network interface controller (NIC)) having one or more ports connected or coupled to network communication channel 775. In an embodiment, network communication channel 775 includes a PHY device (not shown). In an embodiment, network I/O device 710 is an Ethernet NIC. Network I/O device 710 transmits data packets from computing platform 701 over network 770 to other destinations and receives data packets from other destinations for forwarding to computing platform 701.

According to some examples, computing platform 701, as shown in FIG. 7, includes circuitry 720, primary memory 730, network (NW) I/O device driver 740, operating system (OS) 750, at least one control plane application 760, and one or more storage devices 765. In one embodiment, OS 750 is Linux™. In another embodiment, OS 750 is Windows® Server. Network I/O device driver 740 operates to initialize and manage I/O requests performed by network I/O device 710. In an embodiment, packets and/or packet metadata transmitted to network I/O device 710 and/or received from network I/O device 710 are stored in one or more of primary memory 730 and/or storage devices 765. In at least one embodiment, virtual switch 120, as compiled by compiler 104, is a packet processing application. In at least one embodiment, storage devices 765 may be one or more of hard disk drives (HDDs) and/or solid-state drives (SSDs). In an embodiment, storage devices 765 may be non-volatile memories (NVMs). In some examples, as shown in FIG. 7, circuitry 720 may communicatively couple to network I/O device 110 via communications link 155. In one embodiment, communications link 755 is a peripheral component interface express (PCIe) bus conforming to version 3.0 or other versions of the PCIe standard published by the PCI Special Interest Group (PCI-SIG). In some examples, operating system 750, NW I/O device driver 740, virtual switch 120, and application 760 are implemented, at least in part, via cooperation between one or more memory devices included in primary memory 730 (e.g., volatile or non-volatile memory devices), storage devices 765, and elements of circuitry 720 such as processing cores 722-1 to 722-m, where "m" is any positive whole integer greater than 2. In an embodiment, OS 750, NW I/O device driver 740, compiler 104, virtual switch 120, and application 760 are executed by one or more processing cores 722-1 to 722-m.

In some examples, computing platform 701, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 701 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 720 having processing cores 722-1 to 722-m may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 720 may include at least one cache 735 to store data.

According to some examples, primary memory 730 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAIVI). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 730 may include one or more hard disk drives within and/or accessible by computing platform 701.

Figure 8:
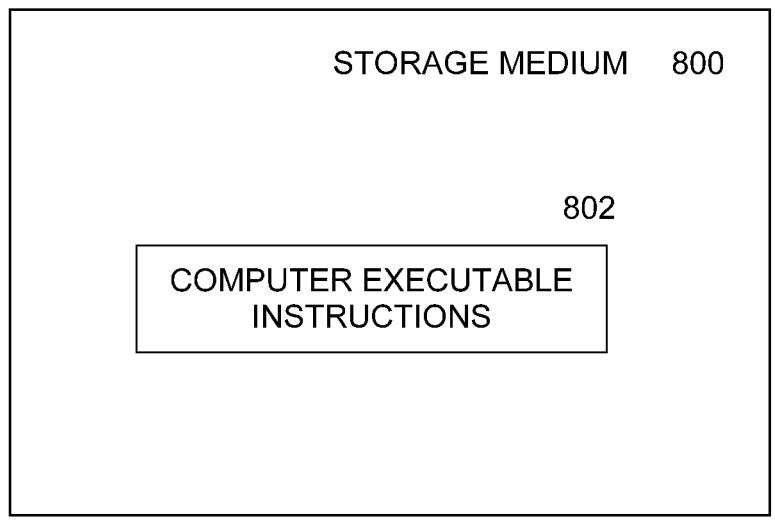
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions 802 to implement logic flows 200, 400, 500, and 600 of FIG. 2, and FIG. 4 through FIG. 6, respectively. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
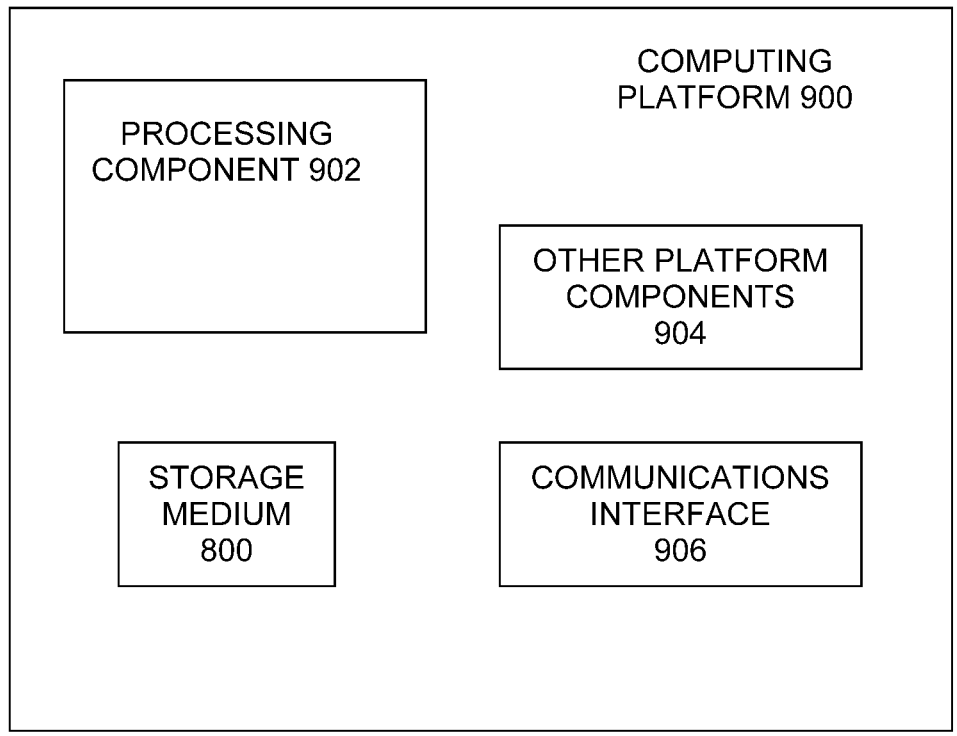
FIG. 9 illustrates another example computing platform.

FIG. 9 illustrates an example computing platform 900. In some examples, as shown in FIG. 9, computing platform 900 may include a processing component 902, other platform components 904 and/or a communications interface 906.

According to some examples, processing component 902 may execute processing operations or logic for instructions stored on storage medium 800. Processing component 902 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 904 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 906 may include logic and/or features to support a communication interface. For these examples, communications interface 906 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 900, including logic represented by the instructions stored on storage medium 800 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    parsing a declarative language program, the program defining a plurality of match-action tables (MATs);
    translating the plurality of MATs into intermediate code;
    parsing a core identifier (ID) assigned to the plurality of MATs; and
    based on the core IDs of the plurality of MATs being the same: connecting intermediate code of the plurality of MATs using function calls, and translating the intermediate code of the plurality of MATs into machine code to be executed by a core identified by the core IDs.

2. The method of claim 1, comprising, based on the core IDs of the plurality of MATs not being the same:
    adding intermediate code to schedule and execute a thread on at least one of a plurality of cores;
    inserting at least one of the plurality of MATs into a function to be called by the thread to be executed on a core identified by the core ID assigned to the at least one of the plurality of MATs;
    connecting intermediate code of the plurality of MATs and the threads; and
    translating the intermediate code of the plurality of MATs into machine code to be executed by the cores identified by the core IDs.

3. The method of claim 2, comprising connecting intermediate code of the plurality of MATs and threads by adding queues for MAT to MAT communication between threads.

4. The method of claim 2, comprising generating application program interface (API) code for a control plane application to set thread affinity to a core during runtime of the declarative language program.

5. The method of claim 1, comprising
    translating a plurality of flow caches into intermediate code;
    parsing a core identifier ID assigned to at least one of the plurality of flow caches; and
    based on the core IDs of the plurality of flow caches being the same: connecting intermediate code of at least two of the plurality of flow caches and the plurality of MATs using function calls, parsing attributes of the plurality of flow caches to find pipeline locations for the flow caches, and translating the intermediate code of at least two of the plurality of flow caches and the plurality of MATs into machine code to be executed by a core identified by the core IDs.

6. The method of claim 5, comprising, based on the core IDs of the plurality of flow caches not being the same:
    adding intermediate code to schedule and execute a thread on at least one of a plurality of cores;
    inserting at least one flow cache into a function to be called by the thread to be executed on a core identified by the core ID assigned to the at least one flow cache;
    parsing attributes of the plurality of flow caches to find pipeline locations for the flow caches,
    connecting intermediate code of at least two of the plurality of flow caches and the plurality of MATs and the threads; and
    translating the intermediate code of at least two of the plurality of flow caches and the plurality of MATs into machine code to be executed by the cores identified by the core IDs.

7. The method of claim 6, comprising connecting intermediate code of at least two of the plurality of flow caches and the plurality of MATs and threads by adding queues for MAT to MAT communication between threads.

8. The method of claim 6, comprising generating application program interface (API) code for a control plane application to set thread affinity to a core during runtime.

9. The method of claim 5, comprising
    parsing an algorithm attribute of at least one of a MAT and a flow cache;
    searching a database of supported algorithms for an algorithm matching the algorithm attribute;
    based on the algorithm identified by the algorithm attribute being supported, translating the at least one of a MAT and a flow cache into intermediate code using the supported algorithm's code fragment; and based on the algorithm identified by the algorithm attribute not being supported, translating the at least one of a MAT and a flow cache into intermediate code using a default algorithm's code fragment.

10. The method of claim 9, comprising
adding cache locking intermediate code to the intermediate code of the at least one of a MAT and a flow cache based on the at least one of a MAT having a high priority attribute.

11. At least one tangible non-transitory machine-readable medium comprising a plurality of instructions that in response to being executed by at least one processor cause the at least one processor to:
parse a declarative language program, the program defining a plurality of match-action tables (MATs);
translate the plurality of MATs into intermediate code;
parse a core identifier (ID) assigned to the plurality of MATs; and
based on the core IDs of the plurality of MATs being the same: connect intermediate code of the plurality of MATs using function calls, and translate the intermediate code of the plurality of MATs into machine code to be executed by a core identified by the core IDs.

12. The at least one tangible machine-readable medium of claim 11, comprising a plurality of instructions, that in response to being executed by at least one processor, cause the at least one processor to: based on the core IDs of the plurality of MATs not being the same:
add intermediate code to schedule and execute a thread on at least one of a plurality of cores;
insert at least one of the plurality of MATs into a function to be called by the thread to be executed on a core identified by the core ID assigned to the at least one of the plurality of MATs;
connect intermediate code of the plurality of MATs and the threads; and
translate the intermediate code of the plurality of MATs into machine code to be executed by the cores identified by the core IDs.

13. The at least one tangible machine-readable medium of claim 12, comprising instructions, that in response to being executed by the at least one processor, cause the at least one processor to connect intermediate code of the plurality of MATs and threads by adding queues for MAT to MAT communication between threads.

14. The at least one tangible machine-readable medium of claim 12, comprising instructions, that in response to being executed by the at least one processor, cause the at least one processor to generate application program interface (API) code for a control plane application to set thread affinity to a core during runtime of the declarative language program.

15. The at least one tangible machine-readable medium of claim 11, comprising instructions, that in response to being executed by the at least one processor, cause the at least one processor to
translate a plurality of flow caches into intermediate code;
parse a core identifier ID assigned to at least one of the plurality of flow caches; and
based on the core IDs of the plurality of flow caches being the same: connect intermediate code of at least two of the plurality of flow caches and the plurality of MATs using function calls, parse attributes of the plurality of flow caches to find pipeline locations for the flow caches, and translate the intermediate code of at least two of the plurality of flow caches and the plurality of MATs into machine code to be executed by a core identified by the core IDs.

16. The at least one tangible machine-readable medium of claim 15, comprising instructions, that in response to being executed by the at least one processor, cause the at least one processor to:
based on the core IDs of the plurality of flow caches not being the same:
add intermediate code to schedule and execute a thread on at least one of a plurality of cores;
insert at least one flow cache into a function to be called by the thread to be executed on a core identified by the core ID assigned to the at least one flow cache;
parse attributes of the plurality of flow caches to find pipeline locations for the flow caches,
connect intermediate code of at least two of the plurality of flow caches and the plurality of the MATs and the threads; and
translate the intermediate code of at least two of the plurality of flow caches and the plurality of MATs into machine code to be executed by the cores identified by the core IDs.

17. The at least one tangible machine-readable medium of claim 16, comprising instructions, that in response to being executed by the at least one processor, cause the at least one processor to connect intermediate code of at least two of the plurality of flow caches and the plurality of MATs and threads by adding queues for MAT to MAT communication between threads.

18. The at least one tangible machine-readable medium of claim 16, comprising instructions, that in response to being executed by the at least one processor, cause the at least one processor to generate application program interface (API) code for a control plane application to set thread affinity to a core during runtime.

19. The at least one tangible machine-readable medium of claim 15, comprising instructions, that in response to being executed by the at least one processor, cause the at least one processor to
parse an algorithm attribute of at least one of a MAT and a flow cache;
search a database of supported algorithms for an algorithm matching the algorithm attribute;
based on the algorithm identified by the algorithm attribute being supported, translate the at least one of a MAT and a flow cache into intermediate code using the supported algorithm's code fragment; and
based on the algorithm identified by the algorithm attribute not being supported, translate the at least one of a MAT and a flow cache into intermediate code using a default algorithm's code fragment.

20. The at least one tangible machine-readable medium of claim 19, comprising instructions, that in response to being executed by the at least one processor, cause the at least one processor to add cache locking intermediate code to the intermediate code of the at least one of a MAT and a flow cache based on the at least one of a MAT having a high priority attribute.

21. The at least one tangible machine-readable medium of claim 11, wherein the declarative language is consistent with P4.

22. A system comprising:
a memory; and
a multi-core processor coupled to the memory, configured to
parse a declarative language program stored in the memory, the program defining a plurality of match-action tables (MATs);
translate the plurality of MATs into intermediate code;

parse a core identifier (ID) assigned to the plurality of MATs; and based on the core IDs of the plurality of MATs being the same: connect intermediate code of the plurality of MATs using function calls, and translate the intermediate code of the plurality of MATs into machine code to be executed by a core identified by the core IDs.

23. The system of claim 22, comprising, based on the core IDs of the plurality of MATs not being the same, the multi-core processor configured to add intermediate code to schedule and execute a thread on at least one of a plurality of cores;

insert at least one of the plurality of MATs into a function to be called by the thread to be executed on a core identified by the core ID assigned to the at least one of the plurality of MATs;

connect intermediate code of the plurality of MATs and the threads; and translate the intermediate code of the plurality of MATs into machine code to be executed by the cores identified by the core IDs.

24. The system of claim 23, comprising the multi-core processor configured to connect intermediate code of the plurality of MATs and threads by adding queues for MAT to MAT communication between threads.

25. The system of claim 22, comprising the multi-core processor configured to translate a plurality of flow caches into intermediate code;

parse a core identifier ID assigned to the plurality of flow caches; and based on the core IDs of the plurality of flow caches being the same: connect intermediate code of at least two of the plurality of flow caches and the plurality of MATs using function calls, parse attributes of the plurality of flow caches to find pipeline locations for the flow caches, and translate the intermediate code of at least two of the plurality of flow caches and the plurality of MATs into machine code to be executed by a core identified by the core IDs.

26. The system of claim 25, comprising, based on the core IDs of the plurality of flow caches not being the same, the multi-core processor configured to add intermediate code to schedule and execute a thread on at least one of a plurality of cores;

insert at least one flow cache into a function to be called by the thread to be executed on a core identified by the core ID assigned to the at least one flow cache;

parse attributes of the plurality of flow caches to find pipeline locations for the flow caches, connect intermediate code of at least two of the plurality of flow caches and the plurality of the MATs and the threads; and translate the intermediate code of at least two of the plurality of flow caches and the plurality of MATs into machine code to be executed by the cores identified by the core IDs.

27. The system of claim 26, comprising the multi-core processor configured to connect intermediate code of the plurality of flow caches and threads by adding queues for MAT to MAT communication between threads.

28. At least one tangible non-transitory machine-readable medium comprising a plurality of instructions that in response to being executed by at least one processor cause the at least one processor to execute compiler that is to perform:

parsing a declarative language program, the program defining a plurality of match-action tables (MATs), translate the plurality of MATs into intermediate code, parse a core identifier (ID) assigned to the plurality of MATs, and based on the core IDs of the plurality of MATs being the same, connect intermediate code of the plurality of MATs using function calls; and translating the intermediate code of the plurality of MATs into machine code to be executed by a core identified by the core IDs.

29. The at least one tangible non-transitory machine-readable medium of claim 28, comprising a plurality of instructions that in response to being executed by at least one processor cause the at least one processor to:

based on the core IDs of the plurality of MATs are not the same:

adding intermediate code to schedule and execute a thread on at least one of a plurality of cores, insert at least one of the plurality of MATs into a function to be called by the thread to be executed on a core identified by the core ID assigned to the at least one of the plurality of MATs, connect intermediate code of the plurality of MATs and the threads; and translating the intermediate code of the plurality of MATs into machine code to be executed by the cores identified by the core IDs.

* * * * *